United States Patent [19]

Nakagawa

[11] Patent Number: 5,243,705
[45] Date of Patent: Sep. 7, 1993

[54] SYSTEM FOR RAPID RETURN OF EXCEPTIONAL PROCESSING DURING SEQUENCE OPERATION INSTRUCTION EXECUTION

[75] Inventor: Teruo Nakagawa, Aichi, Japan
[73] Assignee: Mitsubishi Denki K.K., Tokyo, Japan
[21] Appl. No.: 625,233
[22] Filed: Dec. 10, 1990

[30] Foreign Application Priority Data

Dec. 11, 1989 [JP] Japan ............................ 1-321088
Aug. 17, 1990 [JP] Japan ............................ 2-217785

[51] Int. Cl.$^5$ ............................................... G06F 9/40
[52] U.S. Cl. ................................. 395/375; 364/262.4; 364/263.3; 364/DIG. 1; 395/775
[58] Field of Search ............................ 395/375, 775

[56] References Cited

U.S. PATENT DOCUMENTS 4,853,845 8/1989 Zimmer ............................ 395/375

*Primary Examiner*—Parshotam S. Lall
*Assistant Examiner*—Ayni Mohamed
*Attorney, Agent, or Firm*—Sughrue, Mion, Zinn, Macpeak & Seas

[57] ABSTRACT

A high-speed data processor capable of processing a special operation instruction such as a sequence operation instruction which is different from a normal execution instruction at high speeds. The high-speed data processor is capable of simultaneously reading and executing a special operation instruction which is a sequence operation instruction, even if an instruction prefetchable CPU is used, so that its data processing speed can be improved. Further, the data processor is also capable of causing the CPU to rapidly return from exceptional processing such as interrupt processing when the special operation is being executed, without making the operation result incorrect nor requiring any large instruction memory.

2 Claims, 11 Drawing Sheets

601~607, 610~613: INSTRUCTION

701~706, 710~714: INSTRUCTION

SYSTEM FOR RAPID RETURN OF EXCEPTIONAL PROCESSING DURING SEQUENCE OPERATION INSTRUCTION EXECUTION

BACKGROUND OF THE INVENTION

This invention relates to high-speed data processors (sequence operation processors) capable of processing a special operation instruction (sequence operation instruction) which is different from a normal execution instruction at high speeds.

FIG. 9 is a system configuration diagram showing an exemplary sequence operation processor which is a conventional data processor. In the figure, reference numeral 1 designates a prefetchable central processing unit (CPU); 2, a memory for storing a normal execution instruction or a sequence operation instruction that is a special operation instruction; 3, a decoder for decoding a command (an instruction) applied from the CPU 1 when the instruction read from the memory 2 is an instruction for a sequence operation; 4, a sequence operation control section for causing the sequence operation to be executed by a decode signal 5 from decoder 3 and an address and data from the CPU 1; 6, a sequence operation register; 7, a working RAM for storing the result of the sequence operation; 8, an address bus; and 9, a data bus.

FIG. 10 is an operation sequence diagram which explains the operation of the sequence operation processor shown in FIG. 9. In the figure, reference numerals 201-220 designate cycles in its operation process.

An operation of the conventional sequence operation processor shown in FIG. 9 will be described with reference to the operation sequence diagram shown in FIG. 10. An address applied from the CPU 1 through the address bus 8 reads an instruction from the memory 2, and the read instruction is received by the CPU 1. While decoding and executing the read instruction, the CPU 1, if ready to prefetch an instruction, reads a next instruction from the memory 2 and decodes it.

If the instruction decoded by the CPU 1 is an instruction for a sequence operation, the CPU 1 issues a predetermined command to the decoder 3 for the sequence operation and request for a sequence operation start. The received command causes the decoder 3 to send a target decode signal 5 to sequence operation control section 4. The sequence operation control section 4, in turn, executes the sequence operation by decoding the decode signal 5, the address in the address bus 8, and the data in data bus 9, and stores the result of the sequence operation in the working RAM 7.

Indicating such an operation over the operation sequence diagram shown in FIG. 10, cycles 201-210 designate instruction reading (FETCH, hereinafter referred to as "F") operation by the CPU 1, an instruction decoding (DECODE: hereinafter referred to as "D") operation, and an instruction executing (EXECUTE: hereinafter referred to as "E") operation; cycles 211-220, an instruction reading F operation, an instruction decoding D operation, and an instruction executing E operation by CPU 1, and a sequence operation executing E operation by the sequence operation processor.

The instruction executing cycle by the CPU 1 will now be described taking cycles 201-210 as an example. The CPU 1 reads an instruction from memory 2 at cycle 201, decodes the read instruction at the cycle 202, and executes the decoded instruction at the cycle 203. If ready to prefetch an instruction during the instruction decoding and executing cycles, the CPU 1 reads an instruction at cycle 205, decodes the read instruction at cycle 204, and executes various operations at cycle 206 when ready to execute the next instruction. If ready to prefetch another instruction again after having executed the instruction, the CPU 1 reads an instruction from the memory 2 at the cycle 208. With the above operations, the CPU 1 completes a set of instruction executing cycles.

Cycles 211-220 at which the sequence operation processor executes a sequence operation will next be described. If an instruction read by the CPU 1 at cycle 211 is decoded to be a sequence operation instruction at cycle 212, the sequence operation instruction is executed by causing the CPU 1 to apply a command, an address, and data to both decoder 3 and sequence operation control section 4 taking advantage of instruction executing cycle 213. The CPU 1, not being able to read any instruction during this sequence operation instruction execution cycle, can decode only a prefetched instruction corresponding to a number of pipelines within the CPU 1 among the prefetched instructions at cycle 214 when cycle 213 is being executed and at cycle 217 when cycle 216 is being executed.

FIG. 11 is a system configuration diagram showing another exemplary sequence operation processor which is a conventional data processor disclosed in, e.g., Published Unexamined Japaneaese Patent Application No. 38902/1987. In the figure, reference numeral 11 designates a prefetchable CPU; 12, a bit data arithmetic and logic unit (Bit ALU); 13, a programable read only memory (ROM); 14, a pseudo-instruction conversion circuit which, if an instruction applied from the ROM 13 is directed to the Bit ALU 12, converts the instruction to a nonexecution instruction (NOP) and applies the NOP to the CPU 11; 15, a control signal line which informs to the Bit ALU 12 that an instruction currently applied from the ROM 13 is to be directed to the Bit ALU 12, the signal line transmitting the most significant bit (MSB) of the ROM 13; 16, a first data bus for transmitting an instruction applied from the ROM 13; 17, a second data bus for transmitting data between the CPU 11 on the one hand and the pseudo-instruction conversion circuit 14, the Bit ALU 12, and RAM 18 for storing operation results on the other; 19, an external interface circuit (I/F) of a sequence control unit; and 20, an address bus.

FIGS. 12 and 13 are an instruction arrangement diagram and an operation sequence diagram which explain the operation of the sequence operation processor shown in FIG. 11. In the figures, reference numeral 501-504 designate instructions; and 501a-501c, 602a-502d, 503a-503d, 504a-504c, cycles in its operation process.

An operation of the conventional sequence operation processor shown in FIG. 11 will now be described with reference to the instruction arrangement diagram shown in FIG. 12 and the operation sequence diagram shown in FIG. 13. The CPU 11 reads a program written in the ROM 13. If the program read from the ROM 13 is not a program for operating the Bit ALU 12, i.e., a CPU instruction, the MSB of the program is "0." Even if this program is applied to both the Bit ALU 12 and the pseudo-instruction conversion circuit 14 through the control signal line 15, the Bit ALU 12 is not operated while the pseudo-instruction conversion circuit 14 transmits this program applied from the ROM 13 directly to the CPU 11 which causes the CPU 11 to decode and execute the received instruction.

If, on the other hand, the program read by the CPU 11 from the ROM 13 is to operate the Bit ALU 12, i.e., a special operation instruction, the MSB of the program is "1," and the program is applied to both the Bit ALU 12 and the pseudo-instruction conversion circuit 14 through the control signal line 15. Upon reception of the program, the Bit ALU 12 executes bit data processing over data held in the RAM 18 by an instruction (data) applied from the ROM 13. At the same time, the pseudo-instruction conversion circuit 14 converts the special operation instruction applied from the ROM 13 to a nonexecution instruction (NOP) for the CPU 11 and applies the NOP to the CPU 11. The CPU 11 then decodes and executes the NOP, and proceeds to a next cycle ignoring any external access. That is, the Bit ALU 12 can execute bit data processing while the CPU 11 is executing an instruction prefetch cycle.

Indicating the above operation over the instruction arrangement diagram shown in FIG. 12 and the operation sequence diagram shown in FIG. 13, reference numerals 501, 504 designate CPU instructions; and 502, 503, special operation instructions in FIG. 12. Describing the same operation with respect to the operation sequence diagram shown in FIG. 13, with reference to the cycles for CPU instruction 501, the CPU 11 reads an instruction from the ROM 13 at reading cycle 501a, decodes the read instruction at decoding cycle 501b, and executes the decoded instruction at executing cycle 501c. With respect to the cycles for CPU instruction 504, the cycles similar to the above will be repeated to execute the instruction.

With respect to the cycles for executing special operation instruction 502 by the Bit ALU 12, CPU 11 only reads an instruction applied from the ROM 13 and converted to NOP at cycle 502a, decodes the NOP at cycle 502b, and executes the NOP at cycle 502c, and at the same time, causes the Bit ALU 12 to execute the special operation at special operation executing cycle 502d. These operations are similarly applied to special operation instruction 503.

Since the sequence operation processor shown in FIG. 9, which is a conventional data processor, is constructed as described above, even if CPU 1 that is capable of prefetching an instruction is used to execute a sequence operation, it is after the CPU 1 has read the instruction and decoded the sequence operation instruction that the sequence operation control section 4 executes the instruction. Thus, while the instruction is being read by the CPU 1, the sequence operation control section 4 cannot execute the sequence operation instruction, thereby not allowing the CPU 1 to read an instruction when the sequence operation is being executed by the sequence operation control section 4. Thus, the sequence operation processing time is long.

In order to overcome the above problem of increased sequence operation processing time, the sequence operation processor shown in FIG. 11, which is disclosed in Published Unexamined Japanese Patent Application No. 38902/1987, has been proposed. This sequence operation processor executes a special operation, i.e., a sequence operation, only during the instruction reading cycle, eliminating the need for CPU11 to send data to the sequence operation processor in executing the special operation, thereby allowing a high-speed special operation. However, if prefetchable CPU 11 is used to improve data processing performance, the data processor executes the special operation processing for a prefetched instruction before an instruction that is currently being executed by CPU 11. As a result, if exceptional processing such as interrupt processing occurs, when the CPU 11 returns from taking care of such exceptional processing, a special operation instruction which has been prefetched but not executed as a nonexecution instruction by the CPU 11 is executed again, thereby making the operation result incorrect. Thus, the CPU 11 must not be returned immediately in such a case. In addition, if a special operation instruction is arranged after a CPU instruction within a prefetchable range, and if the CPU instruction is such an instruction that uses the result of the special operation, the result of the special operation which is to be used upon decoding the CPU instruction is the result of the special operation executed by prefetching the instruction. Thus, the succeeding instruction is unreasonably executed before the preceding instruction is executed. As a result, no special operation instruction can be arranged immediately after a CPU instruction. Thus, the instructions must be arranged in such an order: a CPU instruction, a dummy instruction, and a special operation instruction, resulting in a bulky instruction memory.

SUMMARY OF THE INVENTION

The invention has been made in view of such circumstances and has as an object the provision of a data processor capable not only of simultaneously reading and executing a special operation instruction, which is a sequence operation instruction, even if an instruction prefetchable CPU is used, so that its data processing speed can be improved, but also of causing the CPU to rapidly return from exceptional processing such as interrupt processing when the special operation is being executed, without making the operation result incorrect nor requiring any large instruction memory.

A first aspect of the invention provides a data processor comprises: a CPU capable not only of reading, decoding, and executing instructions from a memory in accordance with a machine cycle but also of prefetching at least one instruction; a decoder for judging if the instruction read from the memory by the CPU is a normal execution instruction or a special operation instruction; an address judgment circuit which, if the instruction is judged to be a normal execution instruction, causes the CPU to continuously read, decode, and execute the instruction, and if the instruction is judged to be a special operation instruction, not only causes the CPU to read and execute a nonexecution instruction but also judges whether or not the special operation is executed by judging the address in memory at which the special operation instruction has been stored. If the special operation instruction is judged to be executable by the address judgment circuit, the data processor causes the CPU to decode and execute the special operation instruction, and the data within the data processor is either saved from or reloaded to the memory.

A second aspect of the invention provides a data processor comprises: a central processing unit capable not only of reading, decoding, and executing instructions from a memory in accordance with a machine cycle but also of prefetching at least one instruction; a special operation instruction judgment means for judging whether or not the instruction read from the memory is a normal execution instruction or a special operation instruction, a special operation invalidate instruction judgment means for judging whether or not the instruction read from the memory is a specified special operation invalidate instruction, the special operation invalidate instruction judgment means causing the central processing unit to issue a reset command upon judgment that the instruction is a special operation invalidate instruction or holding a special operation invalidate signal until the central processing unit reads a special operation resume instruction from the memory; an address coincidence judgment means for judging whether or not the address in the memory at which the special operation instruction has been stored coincides with the address at which a special operation instruction having been executed within a predetermined number of times has been stored and for outputting an address coincidence signal if the addresses are coincident with each other. If the instruction read from the memory is judged to be a normal execution instruction by the special operation instruction judgment means, the special operation invalidate instruction judgment means, and the address coincidence judgment means, the data processor causes the central processing unit to continuously read, decode, and execute the normal execution instruction. If the special operation instruction is judged to be either a special operation invalidate instruction or a special operation resume instruction, the data processor causes the central processing unit to read and execute a nonexecution instruction; if the special operation invalidate signal or the address coincidence signal are valid, causes the central processing unit not to execute the special operation. If the special operation instruction detection signal is valid and both the special operation invalidate signal and the address coincidence signal are invalid, the data processor causes the central processing unit to execute the special operation.

The data processor according to the first aspect of the invention executes a special operation instruction simultaneously with decoding and executing a CPU instruction, thereby curtailing the special operation processing time.

In addition, in the event of exceptional processing such as interrupt processing during execution of a special operation, the data processor, with its address judgment circuit and sequence operation stack control circuit, can return from the exceptional processing easily and thus execute the special operation rapidly.

When executing the special operation instruction, the data processor according to the second aspect of the invention causes the CPU to execute a special operation instruction read to the data processor simultaneously with causing the CPU to decode and execute a nonexecution instruction (NOP), thereby reducing the special operation processing time. The address coincidence judgment means of the data processor, requiring no additional processing at the time the data processor returns from exceptional processing such as interrupt processing, allows special operations to be executed rapidly and correctly. In addition, the special operation invalidate instruction judgment means of the data processor, allowing a special operation instruction to be arranged immediately after a CPU instruction that uses the result of the special operation, contributes to keeping the instruction memory capacity from increasing even in a case where the CPU can prefetch a large number of instructions.

DESCRIPTION OF THE PREFERRED EMBODIMENTS

Figure 1:
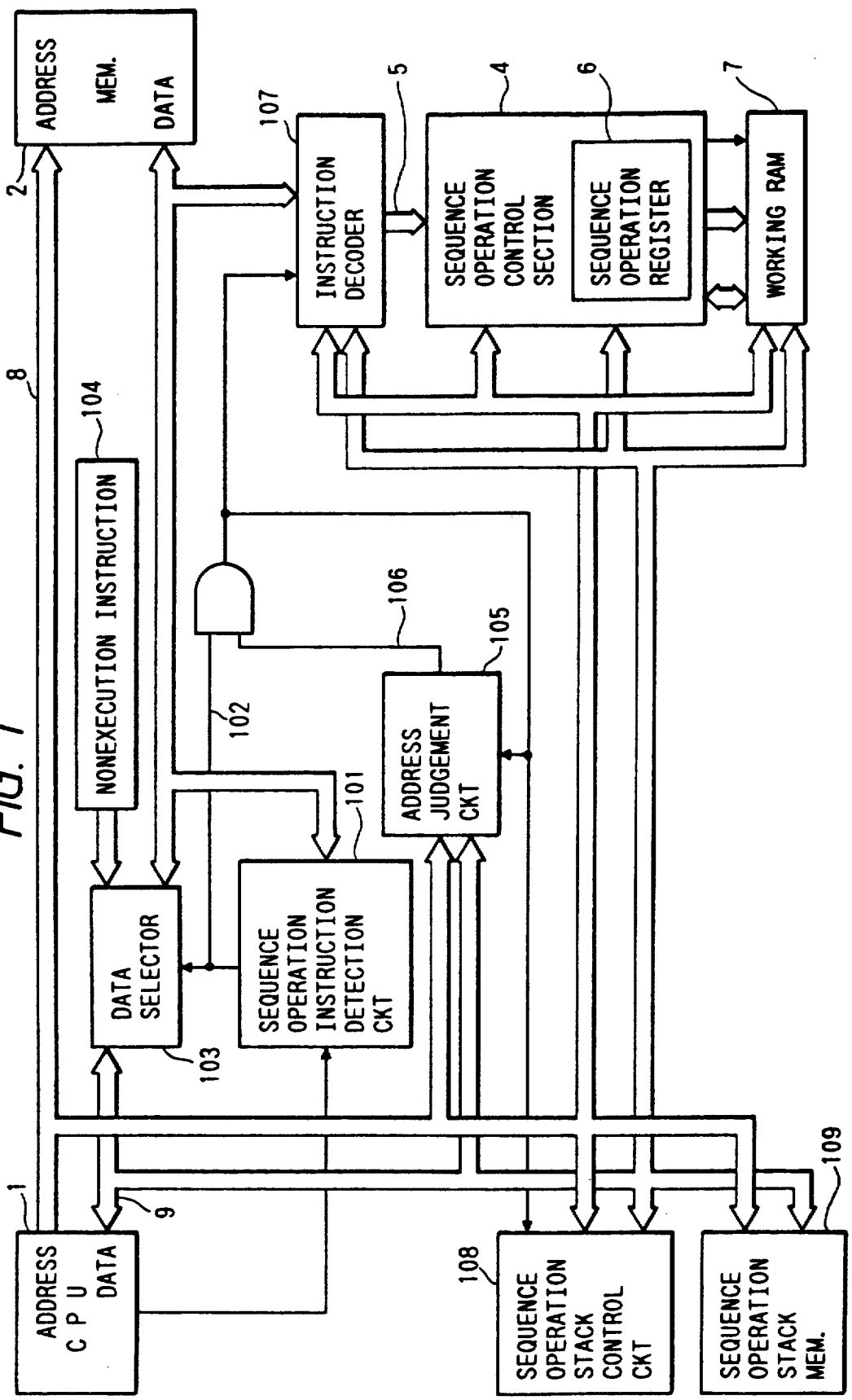
FIG. 1 is a system configuration diagram showing a data processor which is an embodiment of the invention.

FIG. 1 is a system configuration diagram showing a data processor which is an embodiment of the present invention. In the figure, reference numeral 1 is a central processing unit (CPU) which is a prefetchable microprocessor; 2, a memory for storing a normal execution instruction or a special operation instruction; 101, a sequence operation instruction detection circuit, which judges whether or not an instruction read from the memory 2 by an address specified by the CPU 1 is a normal execution instruction or a sequence operation instruction and generates a sequence operation instruction detection signal 102 if the instruction is judged to be a sequence operation instruction; 103, a data selector for switching data to be received by the CPU 1 to either data from the memory 2 or a nonexecution instruction 104 by the sequence operation instruction detection signal 102; 105, an address judgement circuit for judging, when a sequence operation instruction is being read, whether or not the address in the memory 2 at which the instruction is stored coincides with the address at which a sequence operation instruction having been executed within a predetermined number of times has been stored; 106, an address non-coincidence signal which becomes valid when the addresses are judged to be incoincident with each other by the address judgment circuit 105; 107, an instruction decoder for determining the type of sequence operation by latching data from the memory 2 when sequence operation instruction detection signal 102 and the address non-coincidence signal 106 become valid; 108, a sequence operation stack control circuit which not only stores an instruction of the decoder 107, the content of a sequence operation the register 6, the content of a working RAM 7 at the address specified by a sequence operation instruction, and the content of an address of the memory 2 at which the sequence operation instruction has been stored, but also, as instructed by the CPU 1, saves to or reloads from a sequence operation stack memory 109 the instruction of decoder 107, the content of the sequence operation register 6, the content of the working RAM 7 at the address specified by the sequence operation instruction, and the content of the address of the memory 2 at which the sequence operation instruction has been stored if the CPU 1 executes exceptional processing such as interrupt processing or returns therefrom.

Figure 2:
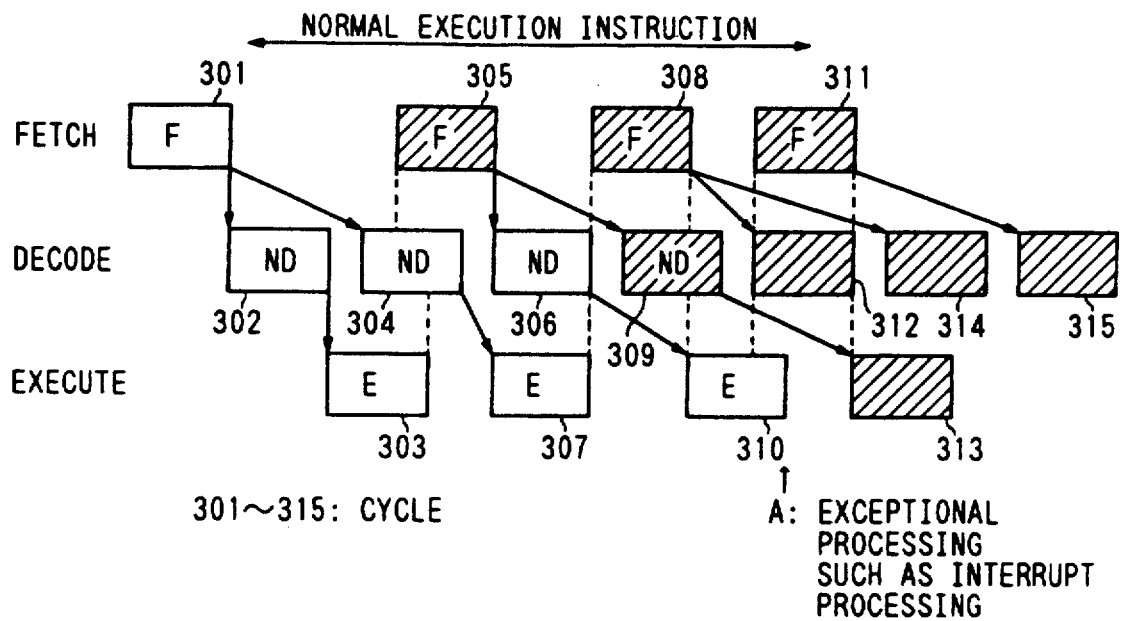
FIGS. 2 and 3 are operation sequence diagrams for explaining the operation of the data processor shown in FIG. 1.
Figure 3:
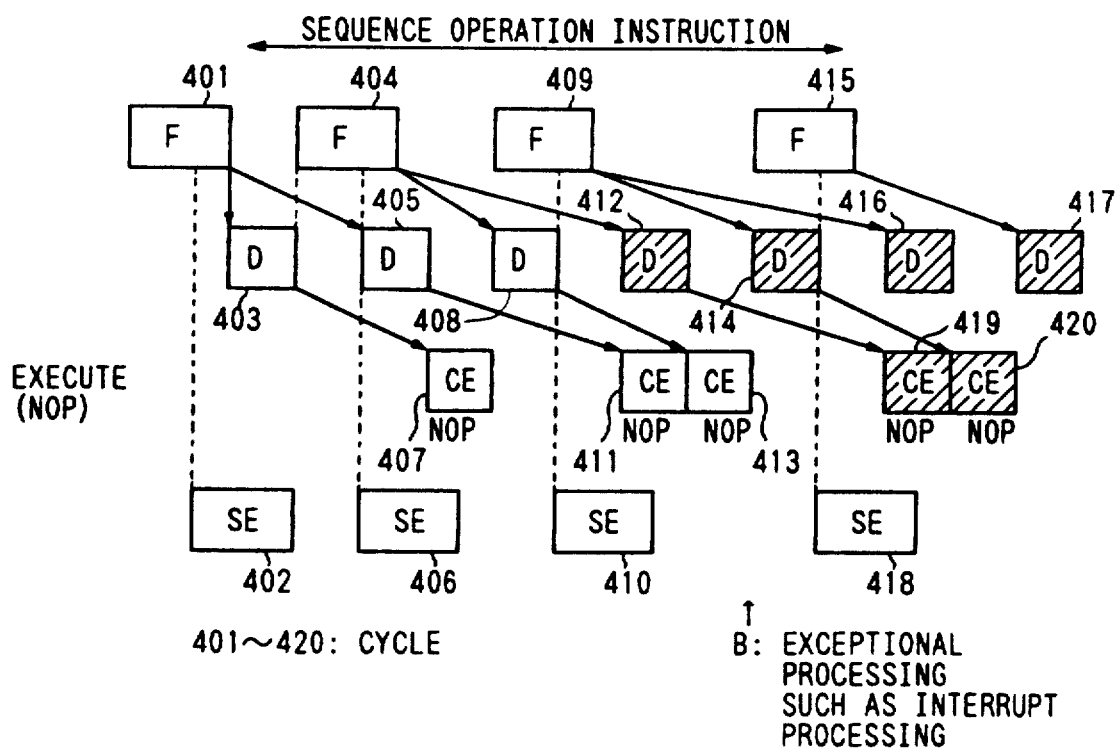

FIGS. 2 and 3 are operation sequence diagrams which explain the operation of the data processor shown in FIG. 1. In the figures, reference numerals 301–315 and 401–420 designate cycles in its operating process.

An operation of the data processor shown in FIG. 1, which is an embodiment of the invention, will now be described with reference to the operation sequence diagrams shown in FIGS. 2 and 3. The memory 2 outputs an instruction from an address corresponding to the address sent from the CPU 1. The instruction output from the memory 2 is judged whether or not it is a normal CPU 1 instruction or a sequence operation instruction by sequence operation instruction detection circuit 101. If it is judged to be a normal execution instruction, the instruction from the memory 2 is selected by the data selector 103, sent to the CPU 1, and decoded and executed by the CPU 1. If, on the other hand, it is judged to be a sequence operation instruction, a nonexecution instruction 104 is selected by the data selector 103, sent to the CPU 1, and decoded and executed by the CPU 1. At this moment, the address judgment circuit 105 judges whether or not the address in the memory 2 at which the instruction has been stored coincides with the address at which a sequence operation instruction having been executed within a predetermined number of times has been stored. If the addresses do not coincide with each other, the instruction from the memory 2 is fed to the instruction decoder 107 for decoding, and the sequence operation is executed by the sequence operation control section 4 thereafter. Its result is stored in the working RAM 7. In addition, simultaneously with the above operation, data such as the instruction applied to the instruction decoder 107, the content of the sequence operation register 6, the content of the address in the memory 2 at which the sequence operation instruction has been stored, and the data in then working RAM 7, all of which are held within the sequence operation stack control circuit 108 are updated.

The internal data of the sequence operation stack control circuit 108 is saved to or reloaded from the sequence operation stack memory 109 by sending a command to the sequence operation stack control circuit 108.

Indicating such an operation over the operation sequence diagrams of FIGS. 2 and 3, a normal execution instruction is read, decoded, and executed by the CPU 1 at cycles 301–315, while a sequence operation is executed by the data processor at cycles 401–420. When the CPU 1 executes the normal execution instruction, the instruction is read from the memory 2 at cycle 301; the instruction is decoded at cycle 302; the decoded instruction is executed at cycle 303.

The CPU 1 also prefetches an instruction at cycles 305–311 and waits for decoding and executing the instruction. At this moment, if exceptional processing such as interrupt processing occurs as shown by reference character A in FIG. 2, the CPU 1 discards the already decoded but not yet executed instruction at cycles 305, 308, and reads the instruction again and executes it upon returning from the exceptional processing.

In executing a sequence operation instruction, the CPU 1 receives the instruction read from the memory 2 as a nonexecution instruction 104 at cycle 401, decodes it at cycle 403, and executes it at cycle 407 so that the sequence operation can be executed by the data processor at cycle 402 while reading cycle 401 is being executed. The CPU 1 also prefetches the nonexecution instructions 104 at cycles 404, 409, and at the same time, executes the sequence operations corresponding to the prefetched instructions at cycles 406, 410. At this moment, if exceptional processing such as interrupt processing occurs as shown by reference character B in FIG. 3, CPU 1 discards the already prefetched but not yet executed instruction at cycle 414, and reads the instruction again, executes it, and receives a nonexecution instruction 104 upon returning from the exceptional processing. However, if the address in memory 2 at this time is judged to be coincident with the address at which a sequence operation instruction having been executed within a predetermined number of times has been stored by the address judgment circuit 105, no sequence operation will be executed. Also, in case of executing the sequence operation during exceptional processing, the state of the system can easily be controlled by applying a command from the CPU 1 to save or reload the data within the data processor.

In an address coincidence judgment means for a sequence operation instruction constituted by the address judgment circuit 105 in the above embodiment, the address corresponding to the sequence operation instruction is always judged to be incoincident with the address in the memory 2 within a predetermined number of times if an initializing instruction has been issued from the CPU 1.

Figure 4:
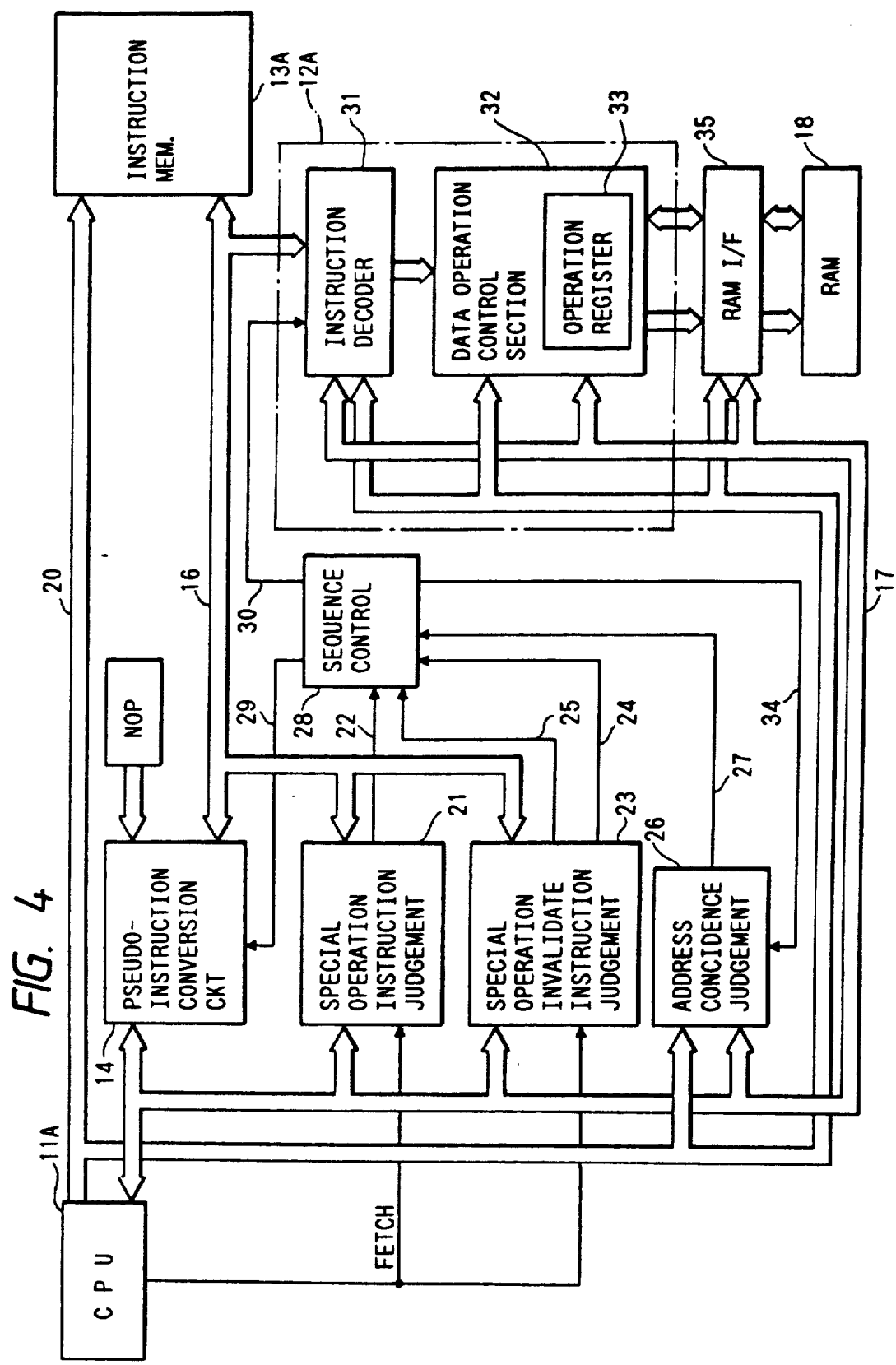
FIG. 4 is a system configuration diagram showing a data processor which is another embodiment of the invention.
Figure 5:
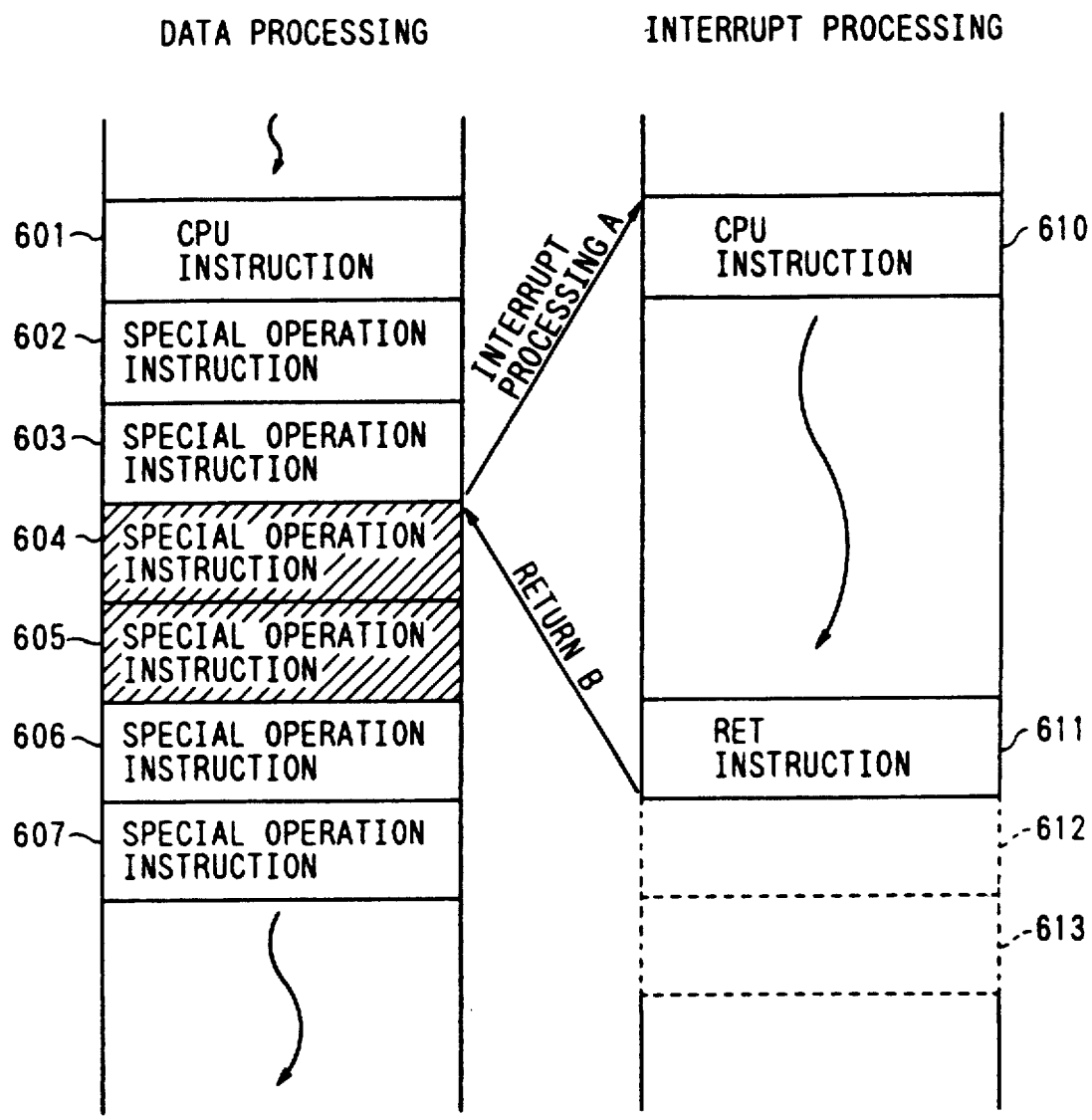
FIGS. 5 and 7 are instruction arrangement diagrams for explaining the operation of the data processor shown in FIG. 4.
Figure 6:
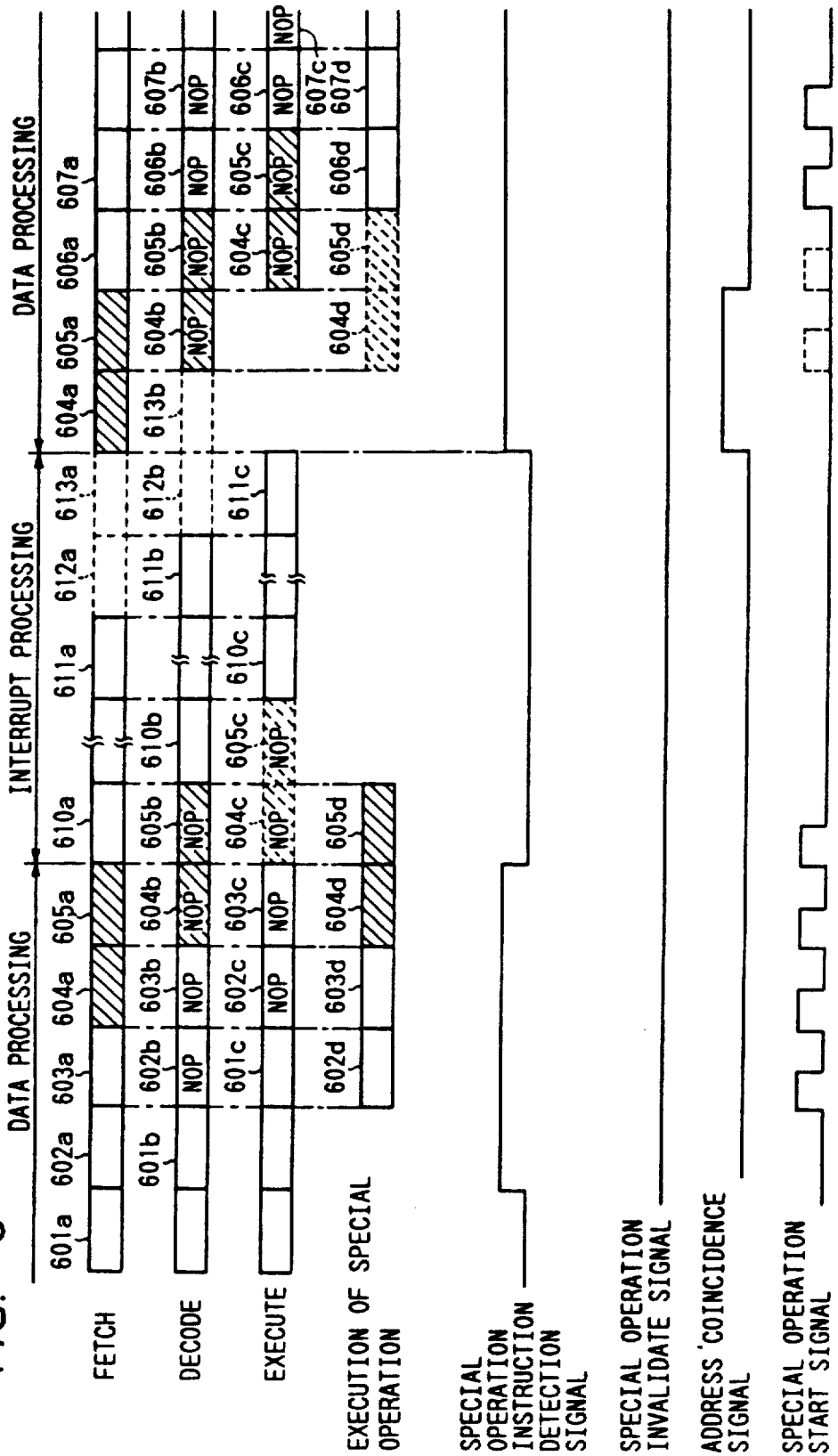
FIGS. 6 and 8 are operation sequence diagrams for explaining the operation of the data processor shown in FIG. 4.
Figure 7:
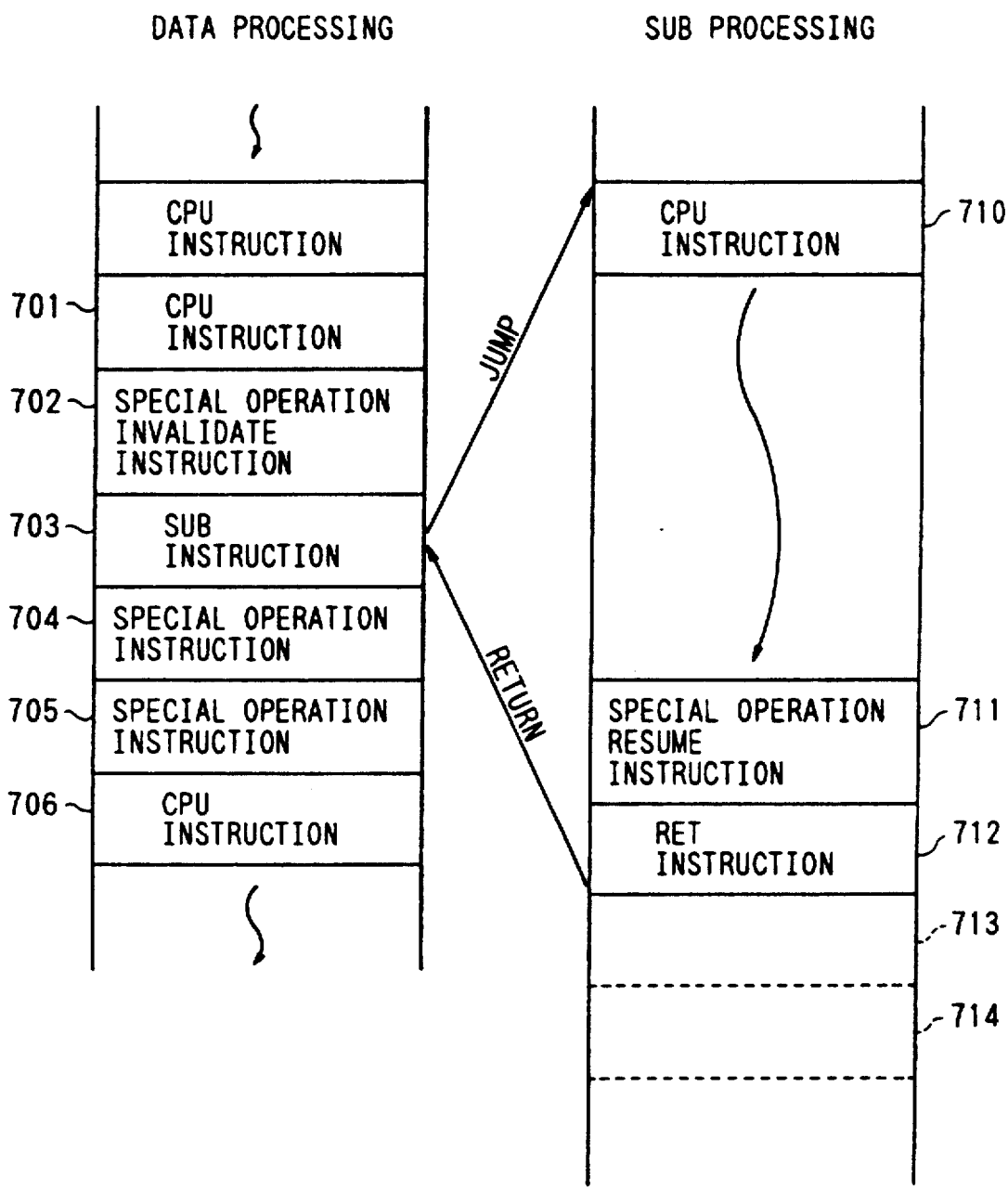
Figure 8:
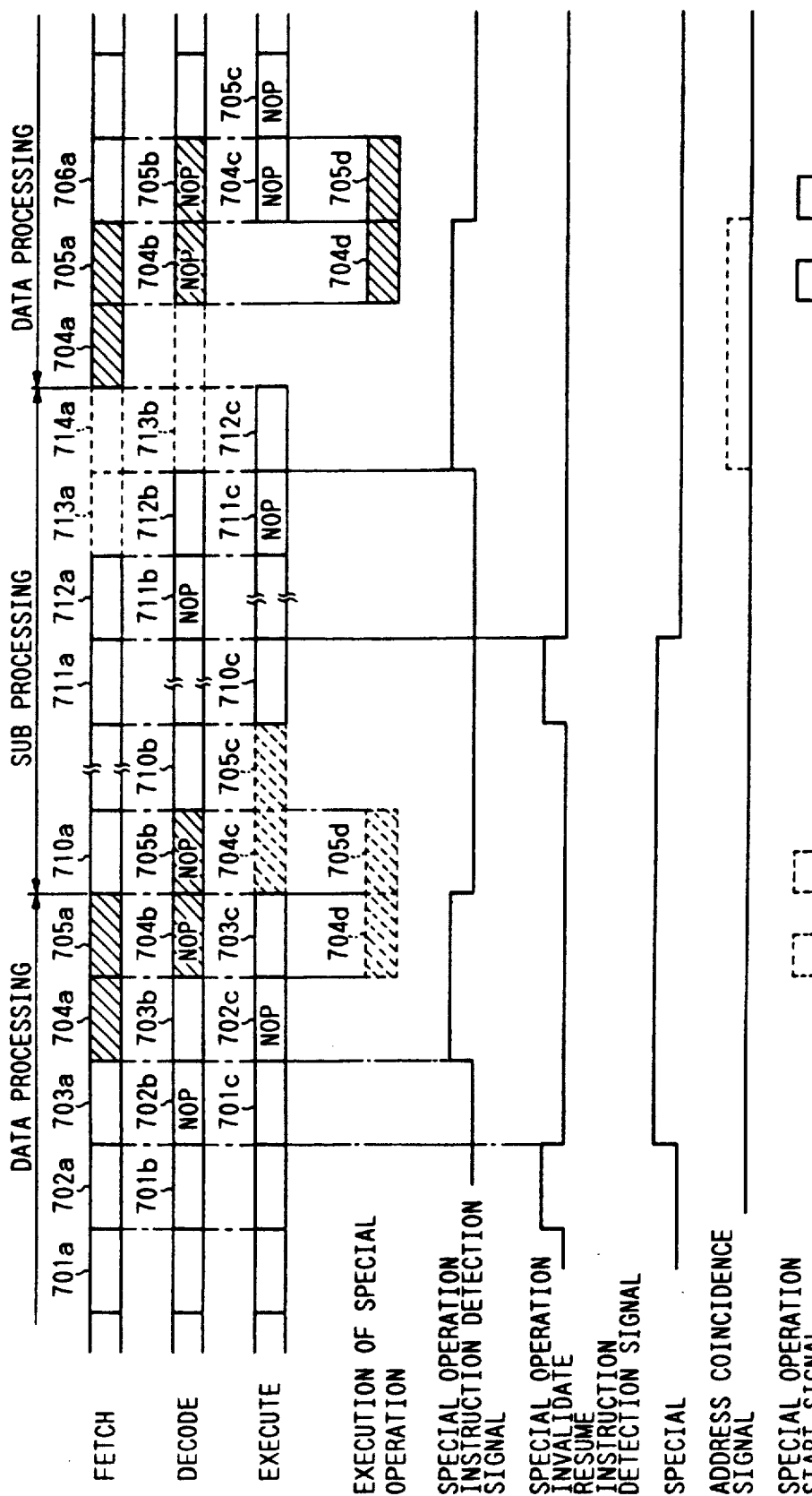
Figure 9:
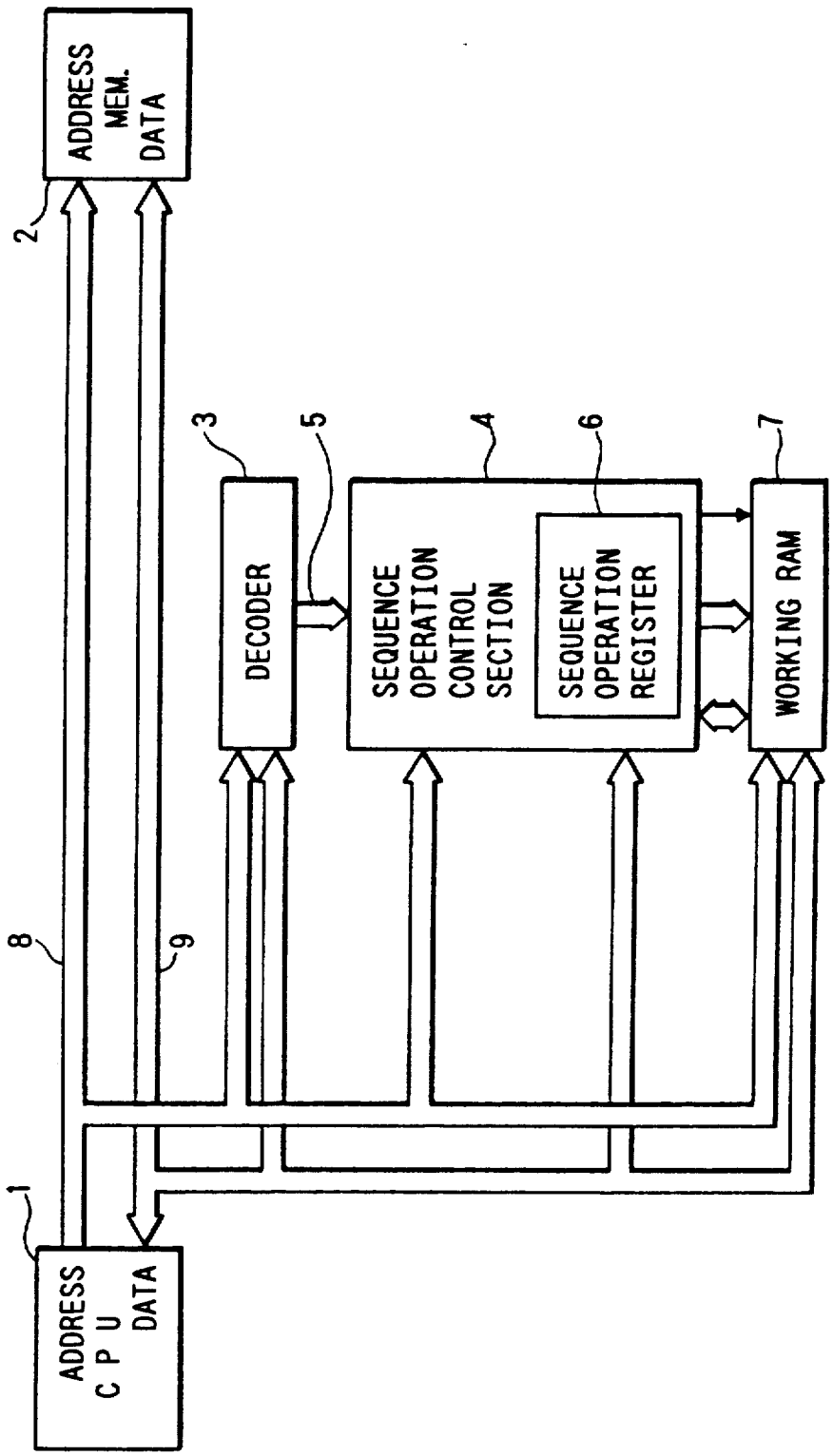
FIG. 9 is a system configuration diagram showing an exemplary sequence operation processor which is a conventional data processor.
Figure 10:
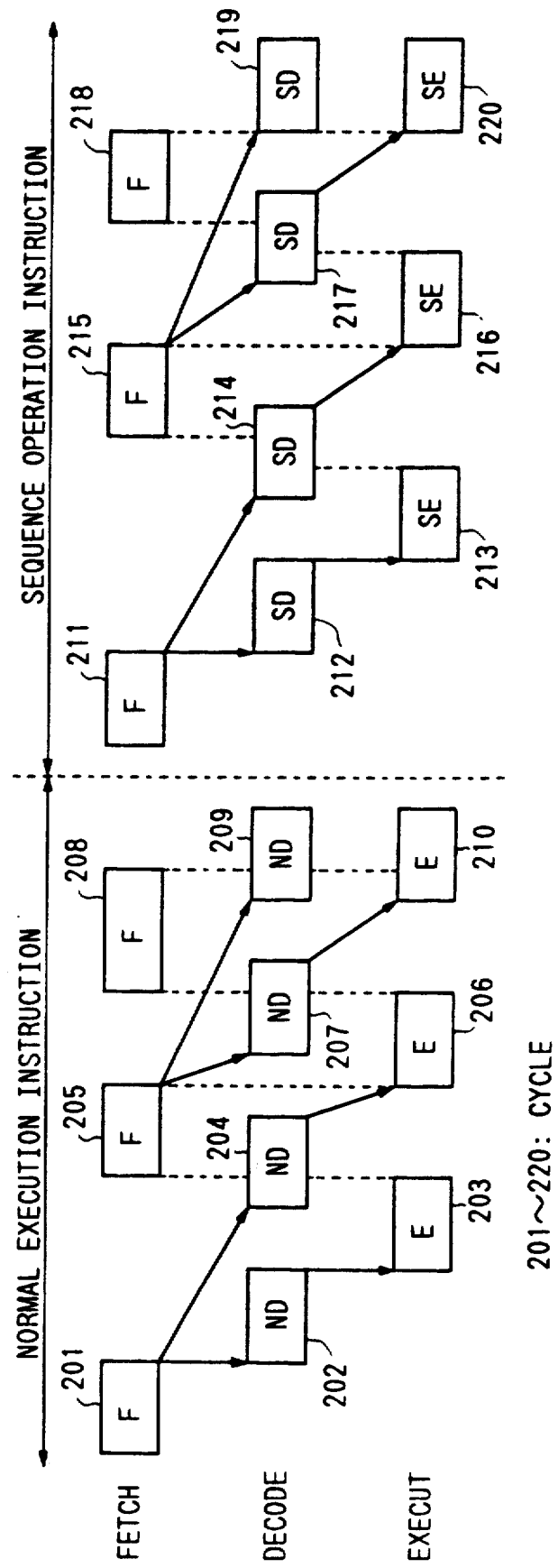
FIG. 10 is an operation sequence diagram for explaining the sequence operation processor shown in FIG. 9.
Figure 11:
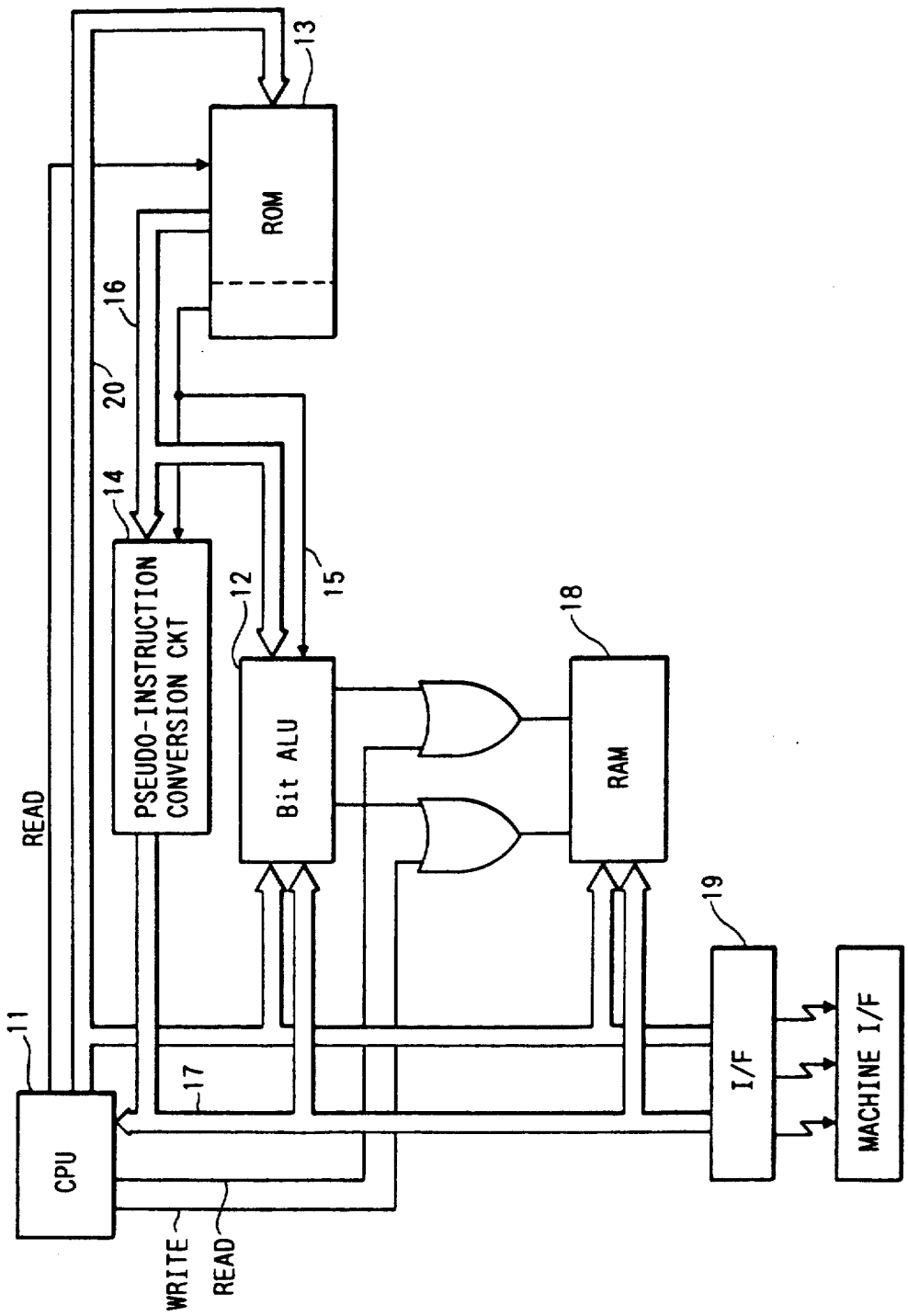
FIG. 11 is a system configuration diagram showing another exemplary sequence operation processor which is a conventional data processor.
Figure 12:
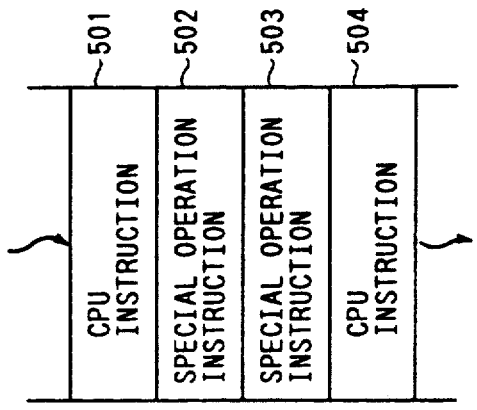
FIG. 12 is an instruction arrangement diagram for explaining the operation of the sequence operation processor shown in FIG. 11.
Figure 13:
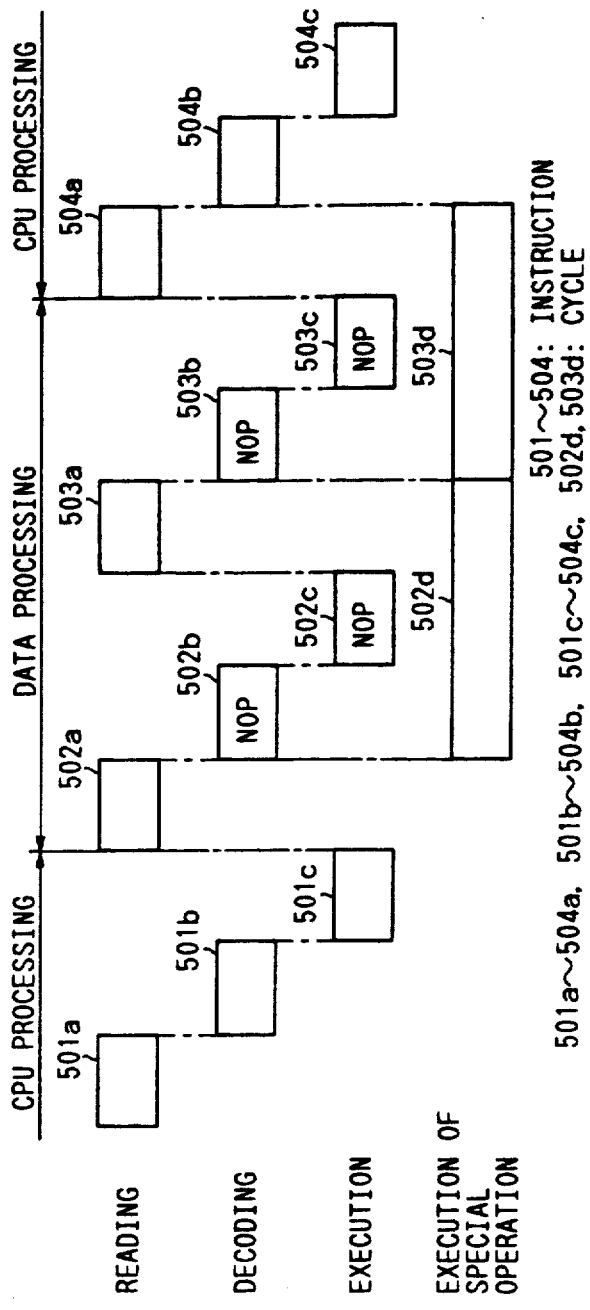
FIG. 13 is an operation sequence diagram for explaining the operation of the sequence operation processor shown in FIG. 11.

FIG. 4 is a system configuration diagram showing a data processor which is another embodiment of the invention. In the figure, reference numeral 11A designates a prefetchable CPU; 13A, an instruction memory for storing a normal execution instruction or a special operation instruction; 21, a special operation instruction judgment means which judges whether the instruction read from instruction memory 13A at an address specified by CPU 11A is a CPU instruction or a special operation instruction, and outputs a special operation instruction detection signal 22 if it is judged to be a special operation instruction; 23, a special operation invalidate instruction judgment means which judges whether the instruction read from the instruction memory 13A at an address specified by the CPU 11A is a specified special operation invalidate instruction, and issues a reset command by CPU 11A upon judgment that the instruction is a special operation invalidate instruction or outputs a special operation invalidate signal 24 until the CPU 1 reads a special operation resume instruction from the instruction memory 13A, and outputs a special operation invalidate/resume instruction detection signal 25 if the instruction read from the instruction memory 13A is a special operation invalidate instruction or a special operation resume instruction; 26, an address coincidence judgment means which judges whether or not the address corresponding to a read special operation instruction coincides with the address at which a special operation instruction having been executed within a predetermined number of times has been stored, and if the addresses coincide with each other, outputs an address coincidence signal 27; 28, a sequence control means which, if the instruction read from the instruction memory 13A by the special operation instruction detection signal 22, the special operation invalidate signal 24, the special operation invalidate/resume 25, and the address coincidence signal 27 is judged to be a normal execution instruction, causes the CPU 11A to read, decode, and execute the normal execution instruction, and if the instruction is judged to be a special operation instruction, outputs a selector signal 29 to a pseudo-instruction conversion circuit 14 so as to cause the CPU 11A to read a NOP instruction, and if the special operation instruction detection signal 22 is valid and both the special operation invalidate signal 24 and the address coincidence signal 27 are invalid, executes data processing by generating a special operation start signal 30 at a data processing section 12A; 31, an instruction decoder which is caused to decode an instruction read from the instruction memory 13A by the special operation start signal 30 and outputs an execution instruction for a data operation control section 32; 33, an operation register, disposed within the data operation control section 32, for holding an operation result; 18, a RAM in which data to be used to execute a special operation instruction is stored; 34, an address data update signal which is applied from the sequence control means 28 to update an address stored in the address coincidence judgment means 26 when a special operation has been executed; and 35, a RAM I/F which enables both the CPU 11A and the data processing section 12A to access the RAM 18 to write and read. FIGS. 5 and 7 are instruction arrangement diagrams which explain the operation of the data processor shown in FIG. 4; and FIGS. 6 and 8 are operation sequence diagrams which explain the operation of the same data processor. In the figures, reference numerals 601-607, 610-613, 701-706, 710-714 designate instructions; and 601a-607a, 610a-613a, 601b-607b, 610b-613b, 601c-607c, 610c-611c, 602d-607d, 701a-706a, 710a-714a, 701b-705b, 701c-705c, 710c-712c, 704d-705d, cycles in its operation process.

An operation of the data processor shown in FIG. 4, which is another embodiment of the invention will be described. An instruction memory 13A outputs an instruction from an address corresponding to the address sent from a CPU 11A. The instruction output from the instruction memory 13A is judged whether it is a CPU instruction or a special operation instruction by a special operation instruction judgment means 21. If judged to be a CPU instruction, neither a special operation instruction detection signal 22 nor a data selector signal 29 are output from a sequence control means 28. As a result, the instruction applied from the instruction memory 13A is selected by the pseudo-instruction conversion circuit 14 and applied to the CPU 11A. The CPU 11A reads this instruction, and decodes and executes it. If the instruction is judged to be a special operation instruction, the special operation instruction detection signal 22 is output, whereby the data selector signal 29 is applied from the sequence control means 28. As a result, a NOP instruction is selected by a pseudo-instruction conversion circuit 14 and applied to the CPU 11A. The CPU 11A reads the NOP instruction, decodes and executes it. At this moment, an address coincidence judgment means 26 judges whether or not the address at which the special operation instruction has been stored coincides with the address at which a special operation instruction having been executed within a predetermined number of times has been. If the addresses coincide with each other, an address coincidence signal 27 is output. A sequence control means 28 outputs a special operation start signal 30 to the data processing section 12A when the special operation instruction detection signal 22 is valid and both address coincidence signal 27 and special operation invalidate signal 24 are invalid. The instruction from the instruction memory 13A is received and decoded by the instruction decoder 31, and thereafter a data operation control section 32 executes data processing and its result is stored in the RAM 18 through RAM I/F 35 if necessary. The sequence control means 28 also applies an address data update signal 34 to the address coincidence judgment means 26, and updates the address at which a special operation instruction having been executed within a predetermined number of times has been stored.

If the instruction read from the instruction memory 13A is judged to be a special operation invalidate instruction, the special operation invalidate/resume instruction detection signal 25 is output, which, in turn, causes the data selector signal 29 to be applied to the pseudo-instruction conversion circuit 14 from the sequence control means 28. As a result, the CPU 11A receives a NOP instruction from the pseudo-instruction conversion circuit 14, and decodes and executes it. Then, if a special operation instruction is read from the instruction memory 13A, the special operation instruction detection signal 22 is output from the special operation instruction judgment means 21. As a result, the CPU 11A receives a NOP instruction, and decodes and executes it. However, since the CPU 11A has received the special operation invalidate signal 24, the sequence control means 28 outputs neither special operation start signal 30 nor address data update signal 34. This causes the contents of the operation register 33 and the address coincidence judgment means 26 to remain unchanged and thus no special operation will be executed. Then, the special operation invalidate signal 24 is reset either by the CPU 11 reading the special operation resume instruction from memory 13A or directly issuing a command for resetting the special operation invalidate signal 24 to special operation invalidate instruction judgment means 23. As a result, when read from the instruction memory 13A thereafter, the special operation instruction is executed normally.

The operation such as above will be described with reference to the instruction arrangement diagrams and the operation sequence diagrams shown in FIGS. 5 to 8. In FIG. 5, reference numeral 601 designates a CPU instruction; 610-613, CPU instructions during interrupt processing; and 602-607, special operation instructions. Describing the above operation with reference to the operation sequence diagram shown in FIG. 6, CPU 11A reads an instruction from the instruction memory 13A at reading cycle 601a, decodes it at cycle 601b, and executes it at cycle 601c. At this moment, simultaneously with decoding the instruction read at cycle 601b, the CPU 11A reads a special operation instruction at cycle 602a. Simultaneously with executing the first instruction at cycle 601c, CPU 11A reads an instruction at cycle 603a, decodes it at cycle 602b, and the data processing section 12A executes data processing at cycle 602d. Accordingly, the CPU 11A, by reading and decoding a next instruction while executing a read instruction, is kept ready to execute the next instruction upon completion of the read instruction. At this moment, if exceptional processing such as interrupt processing occurs the CPU 11A, after executing a NOP instruction at cycle 603c, discards the instruction and data read and decoded in advance at cycles 604b and 605a, respectively, and executes interrupt processing cycles 610–613. Then, when returned from the above interrupt processing cycles, the CPU 11A reads again an instruction 604 which is an instruction next to the instruction 603 that has been executed before entering the interrupt processing cycles. To decode and execute instruction 604, the CPU 11A executes post interrupt processing reading cycles 604a and 605a again thereby causing the special operation instruction detection signal 22 to be applied, and in turn, a NOP instruction is applied to the CPU 11A. However, since special operation cycles 604d, 605d corresponding to cycles 604a, 605a have already been executed before the interrupt processing, the addresses corresponding to the instructions 604, 605 are stored in the address coincidence judgment means 26, and thus the address coincidence signal 27 is applied to the sequence control means 28 at a reading cycle when the CPU 11A has returned from the interrupt processing. As a result, neither special operation start signal 30 nor address data update signal 34 are output, thereby never causing the same special operation (cycles 604d, 605d) to be executed again. Then, with respect to special operation instructions at cycles 605, 607, no address data is stored in the address coincidence judgment means 26. This causes no address coincidence signal 27 to be output and thus allows the special operation to be executed. As described above, even if exceptional processing such as interrupt processing occurs while a special operation is being executed, the special operation instructions 602–607 are executed only once, so that there is no case in which their operation results become incorrect. In addition, there is no need for a procedure to cause CPU 11A to return from the exceptional processing.

A case in which a special operation instruction is arranged after a CPU instruction that uses the result of the special operation will now be described with reference to FIGS. 7 and 8. In FIG. 7, reference numerals 701, 706 designate CPU instructions to CPU 11A; 702, an instruction for invalidating a special operation; 703, a subroutine instruction (SUB instruction) which allows CPU 11A to directly use the result of the special operation; 704, 705, special operation instructions arranged succeeding to SUB instruction 703; 710, a CPU instruction within a subroutine; 711, a special operation resume instruction; and 712, a return instruction (RET instruction) from the subroutine. The above data processing operation will be described with reference to the operation sequence diagram shown in FIG. 8. As has been described above, the CPU 11A reads a CPU instruction at cycle 701a, decodes it at cycle 701b, and executes it at cycle 701c. Here, the CPU 11A reads special operation invalidate instruction 702 from the instruction memory 13A simultaneously with decoding the CPU instruction at 701b. At this moment, the special operation invalidate instruction judgment means 23 applies the special operation invalidate/resume instruction detection signal 25 and the special operation invalidate signal 24 to the sequence control means 28. The sequence control means 28 applies the data selector signal 29 to the pseudo-instruction conversion circuit 14 and a NOP instruction to the CPU 11A. Then, while executing the instruction at cycle 701c, The CPU 11A reads SUB instruction 703 at cycle 703a and, simultaneously therewith, decodes the NOP instruction at cycle 702b. While the NOP instruction is being executed at cycle 702c, CPU 11A reads a special operation instruction at cycle 704a. At this moment, the special operation instruction judgment means 21 applies special operation instruction detection signal 22 to the sequence control means 28, and this causes data selector signal 29 to be applied to the pseudo-instruction conversion circuit 14 so that the CPU 11A reads the NOP instruction. However, since the special operation invalidate signal 24 has been applied to the sequence control means 28, neither special operation start signal 30 nor address data update signal 24 are output. Accordingly the result of the special operation and the content of the address coincidence judgment means 26 remain unchanged. This operation is similarly applied to cycle 705a at which an instruction for the execution of cycle 703c is read. Then, the CPU 11A enters a subroutine processing cycle by executing cycle 703c, uses the result of the special operation while an instruction succeeding CPU instruction 710 is being executed, and then reads special operation resume instruction 711 at a special operation resume instruction reading cycle. This causes the special operation invalidate instruction judgment means 23 to invalidate the special operation invalidate signal 24 and to validate special operation invalidate/resume instruction detection signal 25, so that special operation invalidate/resume instruction detection signal 25 is applied to the sequence control means 28. As a result, the CPU 11A reads a NOP instruction, and thereafter gets ready to execute a special operation when a special operation instruction reading cycle arrives. If the CPU 11A has returned from the subroutine processing by cycle 712b for decoding RET instruction 712 and by cycle 712c for executing it, the CPU 11A reads special operation instruction 704 again at cycle 704a. At this moment, as has been described above, the special operation instruction detection signal 22 is applied to the sequence control means 28 and no special operation invalidate signal 24 is applied thereto. As a result, the CPU 11A not only receives a NOP instruction, is caused to read and execute it, but also executes the special operation with the special operation start signal 30 applied to the data processing section 12A. Also, upon output of the address data update signal 34 to address the coincidence judgment means 26, the CPU 11A updates the address data in the address coincidence judgment means 26. Further, special operation instruction 705 can also be executed at high speeds without increasing the instruction memory 13A by executing the special operation as described above.

As described in the foregoing pages, the data processor of the invention is provided with: the CPU capable not only of reading, decoding, and executing an instruction from a memory in accordance with a machine cycle but also of prefetching an instruction; the decoder for judging the instruction read from the memory by the CPU is a normal execution instruction or a special operation instruction; the address judgment circuit which, if the instruction is judged to be a normal execution instruction, causes the CPU to continuously read, decode, and execute the instruction, and if the instruction is judged to be a special operation instruction, not only causes the CPU to read and execute a nonexecution instruction but also judges whether or not the special operation is executed by judging the address in memory at which the special operation instruction has been stored. If the special operation instruction is judged to be executable by the address judgment circuit, the data processor causes the CPU to decode and execute the special operation instruction, and the data within the data processor is either saved from or reloaded to the memory. This allows the CPU to simultaneously read an instruction and execute a special operation, thereby reducing the special operation processing time. In addition, in the event of exceptional processing such as interrupt processing, the special operation can be executed at high speeds without having to issue a command or the like if the special operation is not executed within the exceptional processing.

The second aspect of the invention provides a data processor which is provided with: the central processing unit capable not only of reading, decoding, and executing an instruction from a memory in accordance with a machine cycle but also of prefetching an instruction; the special operation instruction judgment means for judging whether or not the instruction read from the memory is a normal execution instruction or a special operation instruction, a special operation invalidate instruction judgment means for judging whether or not the instruction read from the memory is a specified special operation invalidate instruction, the special operation invalidate instruction judgment means causing the central processing unit to issue a reset command upon judgment that the instruction is a special operation invalidate instruction or holding a special operation invalidate signal until the central processing unit reads a special operation resume instruction from the memory; the address coincidence judgment means for judging whether or not the address in the memory at which the special operation instruction has been stored coincides with the address at which a special operation instruction having been executed within a predetermined number of times has been stored and for outputting an address coincidence signal if the addresses are coincident with each other. If the instruction read from the memory is judged to be a normal execution instruction by the special operation instruction judgment means, the special operation invalidate instruction judgment means, and the address coincidence judgment means, the data processor causes the central processing unit to continuously read, decode, and execute the normal execution instruction. If the special operation instruction is judged to be either a special operation invalidate instruction or a special operation resume instruction, the data processor causes the central processing unit to read and execute a nonexecution instruction; if the special operation invalidate signal or the address coincidence signal are valid, causes the central processing unit not to execute the special operation. If the special operation instruction detection signal is valid and both the special operation invalidate signal and the address coincidence signal are invalid, the data processor causes the central processing unit to execute the special operation. Therefore, in the event of exceptional processing such as interrupt processing while the special operation is being executed, the special operation can be executed rapidly and easily, allowing the data processor with a small instruction memory to be provided.

What is claimed is:

1. A data processor comprising:
a central processing unit capable of reading, decoding, and executing instructions from a memory in accordance with a machine cycle and also capable of prefetching at least one instruction;
a special operation instruction judgment means for judging whether or not said instruction read from said memory is a normal execution instruction or a special operation instruction;
a control means which, if said instruction read from said memory is judged to be a normal execution instruction by said special operation instruction judgment means, causes said central processing unit to continuously read, decode, execute said instruction read from said memory, and if said instruction read from said memory is judged to be a special operation instruction, causes said central processing unit to read and execute a nonexecution instruction;
an address coincidence judgment means for judging whether or not an address in said memory at which said special operation instruction has been stored coincides with an address at which a special operation instruction having been executed within a predetermined number of times has been stored, said address coincidence judgment means outputting an address coincidence signal if said addresses are coincidence with each other;
a special operation execution control means which, if said address coincidence signal is valid, carries out no special operation, and if said address coincidence signal is invalid, said special operation execution control means temporarily stores in said memory said special operation instruction a content of a special operation register, said address in said memory at which said special operation instruction has been stored and, a content in a working RAM at an address specified by said special operation instruction, and executes said special operation; and
a data control means which, if an instruction to save internal data is issued from said central processing unit, discharges said internal data including said special operation instruction, the content of said special operation register, and the address corresponding to said special operation instruction, said internal data being discharged to a special operation stack memory; and if an instruction to reload said discharged data is issued from said central processing unit, said data control means internally reloading said data in said special operation stack memory.

2. A data processor comprising:
a central processing unit capable of reading, decoding, and executing instructions from memory in accordance with a machine cycle and capable of prefetching at least one instruction;
a special operation instruction judgment means for judging whether or not said instruction read from said memory is a normal execution instruction or a special operation instruction,
a special operation invalidate instruction judgment means for judging whether or not said instruction read from said memory is a specified special operation invalidate instruction, and if said instruction is judged to be a special operation invalidate instruction, said special operation invalidate instruction judgment means either causing said central processing unit to issue a reset command or holding a special operation invalidate signal until said central processing unit reads a special operation resume instruction from said memory;

an address coincidence judgment means for judging whether or not an address in said memory at which said special operation instruction has been stored coincides with an address at which a special operation instruction having been executed within a predetermined number of times has been stored, said address coincidence judgment means outputting an address coincidence signal if said addresses are coincident with each other; and a sequence control means which, if said instruction read from memory is judged to be a normal execution instruction by said special operation instruction judgment means, said special operation invalidate instruction judgment means, and said address coincidence judgment means, causes said central processing unit to continuously read, decode and execute said normal execution instruction; if said special operation instruction is judged to be either a special operation invalidate instruction or a special operation resume instruction, said sequence control means causing said central processing unit to read and execute a nonexecution instruction; if said special operation invalidate signal or said address coincidence signal are valid, said sequence control means causing said central processing unit not to execute said special operation; and if a special operation instruction detection signal is valid and both said special operation invalidate signal and said address coincidence signal are invalid, said sequence control means causing said central processing unit to execute said special operation.

* * * * *